United States Patent [19]
Hong

[11] Patent Number: 5,457,501
[45] Date of Patent: Oct. 10, 1995

[54] SPECTRUM DISTRIBUTION ADAPTIVE LUMINANCE/COLOR SIGNAL SEPARATING DEVICE

[75] Inventor: Sung H. Hong, Seoul, Rep. of Korea

[73] Assignee: Goldstar Co., Ltd., Seoul, Rep. of Korea

[21] Appl. No.: 49,362

[22] Filed: Apr. 21, 1993

[30] Foreign Application Priority Data

Apr. 23, 1992 [KR] Rep. of Korea ............ 6850/1992

[51] Int. Cl.$^6$ ................................................ H04N 9/78
[52] U.S. Cl. ........................ 348/668; 348/665; 348/669; 348/670
[58] Field of Search ........................ 358/31, 36, 37; 348/663, 665, 667, 668, 669, 670; H04N 9/64, 9/78

[56] References Cited

U.S. PATENT DOCUMENTS 4,994,906  2/1991  Moriwake ............... 358/31
5,146,318  8/1992  Ishizuka et al. ........... 358/31

Primary Examiner—Victor R. Kostak
Assistant Examiner—Nathan J. Flynn
Attorney, Agent, or Firm—Pennie & Edmonds

[57] ABSTRACT

A quadrature modulated luminance/color signal separating device applied in a color television receiver. The most suitable luminance/color signal separation is performed by determining sizes of interference components in gross, fine, and superfine structures, thereby solving cross-color, cross-luminance and deterioration of resolution generated in fixed luminance/color signal separation. According to the present device, a control signal properly corresponding to a composite video signal can be generated using a control signal generated in a spectrum distribution adaptive system, and consistency of control signal can be kept by introducing a concept of IIR filter into the control signal. Also, luminance/color signal separation suitable for human visual characteristic can be done, and the luminance/color separating function in a 2-dimensional region can be improved by interference elimination function.

9 Claims, 10 Drawing Sheets

BANDWIDTH OF Y SIGNAL: 4.2MHz
BANDWIDTH OF I SIGNAL: 1.2MHz
BANDWIDTH OF Q SIGNAL: 0.5MHz

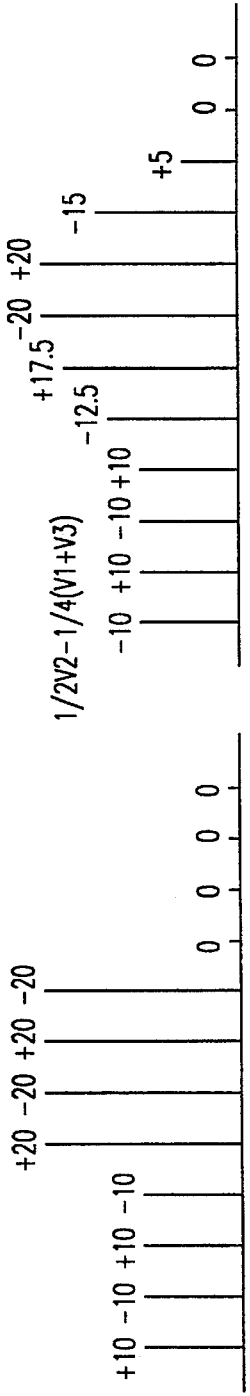
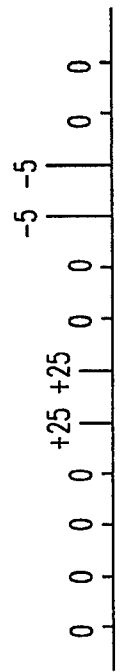
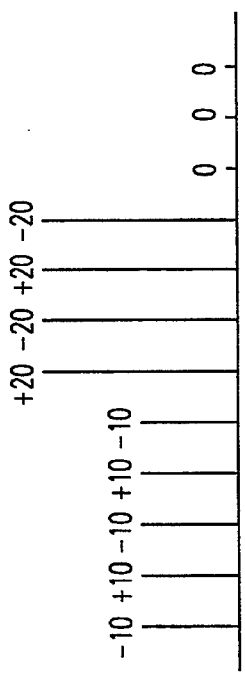
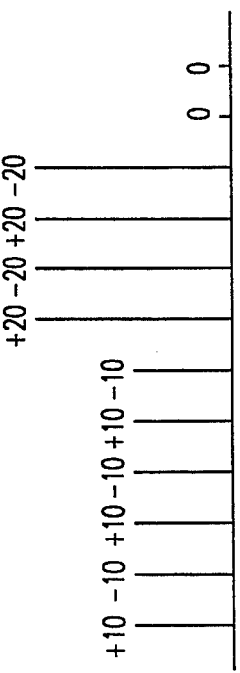
FIG.14A  FIG.14B  FIG.14C  FIG.14D  FIG.14E

SPECTRUM DISTRIBUTION ADAPTIVE LUMINANCE/COLOR SIGNAL SEPARATING DEVICE

BACKGROUND OF THE INVENTION

1. Field of the Invention

The present invention relates to a quadrature modulated luminance/color signal separating device applied in a color television receiver, and more particularly to a spectrum distribution adaptive luminance/color signal separating device which can prevent dot crawling and blurring of color signal due to cross-color and cross-luminance.

2. Description of the Prior Art

A quadrature modulated color television system (National Television System Committee (NTSC) and Phase Alternation by Line (PAL) systems) can effectively use frequency band by interleaving a color signal into a luminance signal. However, if luminance and color signals are falsely separated in a receiver, deterioration of picture quality such as dot crawling, blurring of color signal, or reduction of resolution is generated.

To solve the above problem, a line comb filter and a frame comb filter using the characteristic that phase of color signal is inverted by 180° every line and every frame in NTSC signal are suggested. Also, a motion adaptive luminance/color signal separating device which adaptively uses these filters in an image motion is suggested.

FIG. 1 shows a spectrum distribution of a general NTSC color television signal. The bandwidth of luminance signal Y is 4.2MHz, and in a color signal, I(In-Phase) bandwidth is 1.2MHz, and Q(Quadrature-Phase) bandwidth is 0.5MHz.

FIG. 2 shows a spectrum distribution of luminance signal and color signal near a color subcarrier. The spectrum of luminance signal is repeatedly shown with respect to n•Fn (n: integer, Fn: line frequency ≈5.75KHz), and the spectrum of color signal is repeatedly shown with respect to $(2n+1) \times Fn/2$. Meanwhile, an image having a large change in a vertical direction shows that the spectra of luminance and color signals are severely interfered.

Referring to FIG. 3, a generally used 2-line or 2-frame delay type comb filter comprises a band-pass filter 1 for band-passing a composite video signal CV with respect to a color subcarrier fsc at the center, delay elements 2A and 2B for delaying an output signal of the band-pass filter 1 for a predetermined time (one line or one frame), ½ amplifiers 3A and 3B for ½-amplifying the respective output signals of the band pass filter 1 and the delay element 2B, an adder 4A for detecting a color signal C by subtracting the respective output signals of the amplifiers 3A and 3B from an output signal of the delay element 2A, a ½ amplifier 3C for ½-amplifying a color signal outputted from the adder 4A and outputting it as a final color signal C, and an adder 4B for outputting a luminance signal Y by subtracting an output signal of the ½ amplifier 3C from the composite video signal CV.

Also, referring to FIG. 4, a generally used motion adaptive luminance/color signal separating device comprises a line comb filter 5 and a frame comb filter 6 for respectively separating a line signal and a frame signal from a composite video signal CV, a motion detecting section 7 for determining whether the inputted composite video signal CV is in a motion region, a mixer 8 for respectively selecting a line comb filtered signal when the signal determined in the motion detecting section 7 is in the motion region, and a frame comb filtered signal when it is in a still region, and an adder 9 for obtaining a luminance signal Y by subtracting a color signal C outputted from the mixer 8 from the composite video signal CV.

Referring again to FIG. 3, the circuit is a 2-line comb filter if the delay period of delay elements 2A and 2B having a constant delay period is a 1-line, and is a 2-frame comb filter if it is a 1-frame. The composite video signal V1 passing the band pass filter 1 for filtering with respect to a color subcarrier fsc and the output video signals V2 and V3 of the delay elements 2A and 2B are combined in the adder 4A, from which a color signal $(C = V2/2 - (V1 + V3)/4)$ is outputted. Also, the adder 4B obtains a luminance signal Y by subtracting a color signal outputted from the amplifier 3C from the inputted composite video signal CV.

Referring again to FIG. 4, the inputted composite video signal CV is simultaneously separated into a luminance signal Y and a color signal C by a line comb filter 5 and a frame comb filter 6. The separated luminance signal Y and color signal C are inputted to the mixer 8. The motion detecting section 7 determines the existence or absence of motion of video signal and outputs a control signal according to its determination to the mixer 8. According to the inputted control signal, the mixer 8 selects and outputs a luminance signal Y and a color signal C separated by the line comb filter 5 when a motion exists in an input signal, and only a color signal C separated by the frame comb filter 6 when there is no motion. Meanwhile, the adder 9 outputs a luminance signal Y by subtracting a color signal C outputted from the mixer 8 from the composite video signal CV.

However, such a conventional device provides a relatively good function, but in a video signal changed in a vertical direction, reduction of vertical resolution, hanging dot, and cross-color are generated in the separated luminance/color signal. Also, the frame comb filter provides a relatively good function in an image having no change in a temporal direction, but shows deterioration of picture quality such as blurring in an image having a change in a temporal direction. Particularly, in an image having a large change in the temporal direction, separation into luminance and color signals is not performed, thereby creating the problem of badly deteriorating the picture quality. The most widely used notch filter has the problem of showing reduction of horizontal resolution, dot crawling, and cross-color. As described above, in a motion adaptive luminance/color signal separating device, since the motion detection from the composite video signal in which the luminance signal and the color signal are mixed is inaccurate, the separation into luminance and color signals is also inaccurate, thereby causing deterioration of picture quality. And, even if the detection of motion is accurately done, there is a problem in that the separation into luminance and color signals is imperfectly done when the change of image in the vertical and temporal directions is large.

SUMMARY OF THE INVENTION

It is an object of the present invention to provide a spectrum distribution adaptive luminance/color signal separating device which can prevent dot crawling or blurring of color signal due to cross-color and cross-luminance generated in the separation into luminance and color signals and can increase resolution.

To achieve the object, the device of the present invention comprises:

an analog/digital converter for digital-converting an analog composite video signal;

a band-pass filter for band-pass filtering an output signal of the analog/digital converter with respect to a color subcarrier frequency band;

a 2-sample color-comb filter for 2-sample color signal-comb filtering an output signal of the band-pass filter;

a 2-line color-comb filter for 2-line color signal-comb filtering an output signal of the band-pass filter;

a 2-frame color-comb filter for 2-frame color signal-comb filtering an output signal of the band-pass filter;

a controller for providing a switching control signal according to interference components in gross, fine, and superfine structures, based on an output signal of the 2-frame color-comb filter;

a mixer being supplied with the respective output signals of the 2-sample color-comb filter, the 2-line color-comb filter and the 2-frame color-comb filter according to the switching control signal provided from the controller, and accordingly, selecting and providing a separated color signal in a structure having a smallest spectrum overlapped portion between luminance and color signals in grogs, fine, and superfine structures; and an adder for providing a luminance signal by subtracting the color signal outputted from the mixer from the digital-converted composite video signal.

BRIEF DESCRIPTION OF THE DRAWINGS

The above object and other advantages of the present invention will become more apparent by describing the preferred embodiment of the present invention with reference to the attached drawings, in which:

FIGS. 14A to 14E are views explaining the relation between input and output of the 2P color-comb filter.

DETAILED DESCRIPTION OF THE PREFERRED EMBODIMENTS

Figure 5:
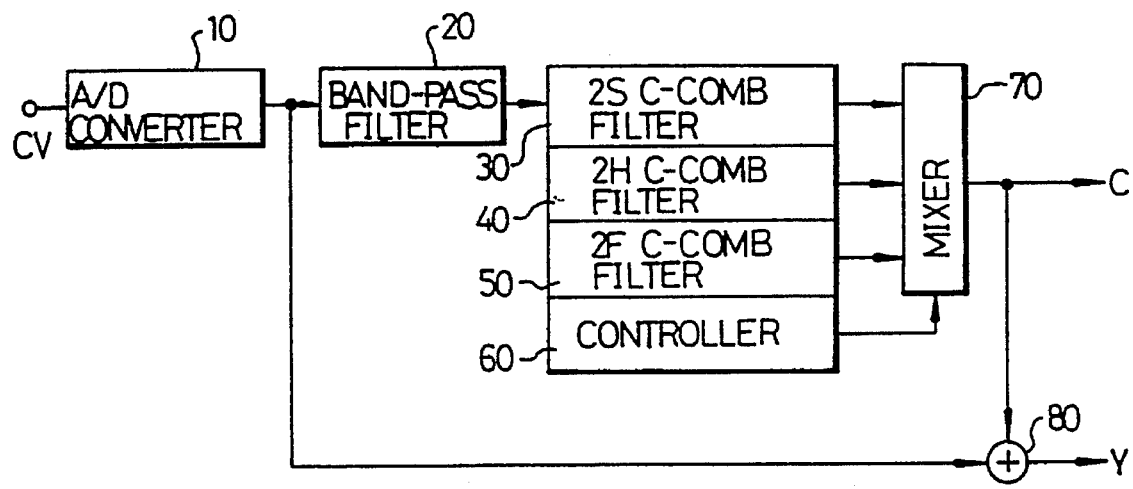
FIG. 5 is a schematic block diagram of a spectrum distribution adaptive 3-dimensional luminance/color signal separating device according to the present invention.

Referring to FIG. 5, a spectrum distribution adaptive 3-dimensional luminance/color signal separating device according to the present invention comprises an analog/digital (A/D) converter 10 for digital-converting an analog composite video signal CV with a sampling frequency of 4 fsc (the center frequency of a color subcarrier), a band-pass filter 20 for band-pass filtering an output signal of the A/D converter 10 with respect to the color subcarrier, a 2-sample color-comb filter (hereinafter referred to as 2S C-comb filter) 30, a 2-line color-comb filter (hereinafter referred to as 2H C-comb filter) 40, and a 2-frame color-comb filter (hereinafter referred to as 2F C-comb filter) 50 for 2S C-comb filtering, 2H C-comb filtering, and 2F C-comb filtering an signal supplied from the band-pass filter 20, respectively, and a controller 60 for outputting a switching control signal according to the respective interference components in gross, fine, and superfine structures based on an output signal of the 2F C-comb filter 50. The luminance/color signal separating device of the present invention also includes a mixer 70 supplied with the respective output signals of the comb filters 30, 40 and 50 according to the switching control signal from the controller 60, and selecting and outputting a color signal C separated in a structure having a smallest spectrum overlapped portion between luminance and color signals in gross, fine and superfine structures, and an adder 80 for detecting and outputting a luminance signal Y by subtracting the color signal C outputted from the mixer 70 from the output signal of the A/D converter 10.

Figure 10:
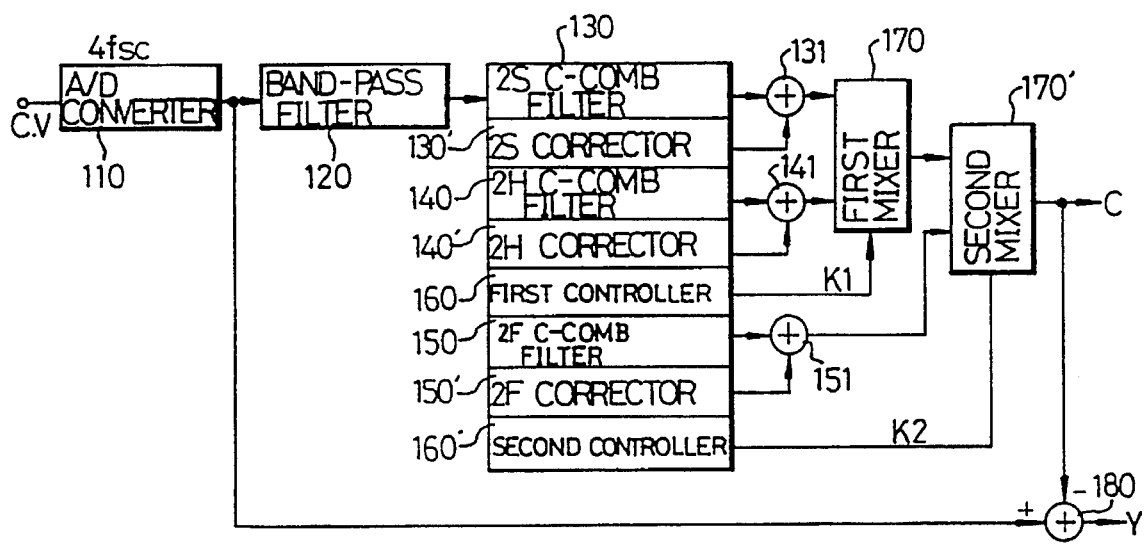
FIG. 10 is a schematic block diagram of a spectrum distribution adaptive 3-dimensional luminance/color signal separating device having a correction function according to the present invention.

Also, referring to FIG. 10, the spectrum distribution adaptive 3-dimensional luminance/color signal separating device having a correction function according to the present invention comprises an A/D converter 110 for digital-converting an analog composite video signal CV with a sampling frequency of 4 fsc, a band-pass filter 120 for band-pass filtering an output signal of the A/D converter 110 with respect to a color subcarrier, a 2S C-comb filter 130, a 2H C-comb filter 140, and a 2F C-comb filter 150 for respectively 2S C-comb filtering, 2H C-comb filtering, and 2F C-comb filtering a signal supplied from the band-pass filter 120, and a 2-sample (2S) corrector 130', a 2-line (2H) corrector 140', and a 2-frame (2F) corrector 150' for providing a signal for eliminating an extra interference component remaining in a separated signal in gross, fine and superfine structures, a first controller 160 for providing a weighting factor K1 keeping consistency with respect to horizontal and vertical regions, and a second controller 160' for providing a weighting factor K2 keeping consistency with respect to a temporal region. The present luminance/color signal separating device also includes an adder 131 for adding an output signal of the 2S corrector 130' to an output signal of the 2S C-comb filter 130, an adder 141 for adding an output signal of the 2H corrector 140' to an output signal of the 2H C-comb filter 140, an adder 151 for adding an output signal of the 2F corrector 150' to an output signal of the 2F C-comb filter 150, a first mixer 170 for adding an output signal of the adder 131, whose interference component is eliminated, multiplied by a weighting factor 1-K1 to an output signal of the adder 141 multiplied by a weighting factor K1, a second mixer 170' for adding an output signal of the adder 151, whose interference component is eliminated, multiplied by a weighting factor K2 to an output signal of the mixer 170 multiplied by a weighting factor 1-K2 in a 2-dimensional region and providing a final color signal C, and an adder 180 for detecting a luminance signal Y by subtracting the final color signal from the second mixer 170' from the output signal of the A/D converter 110.

The operation and effect of the present invention constructed as above will be described in detail with reference to FIGS. 6 to 9, and 11A and 11B to 15.

Figure 1:
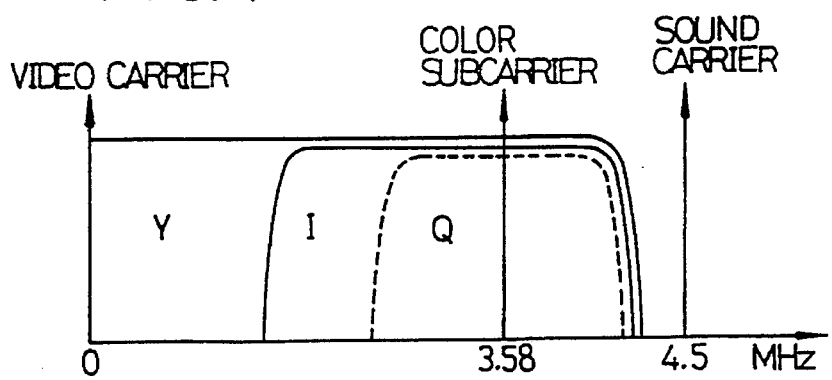
FIG. 1 shows a spectrum of a general NTSC color television signal.
Figure 2:
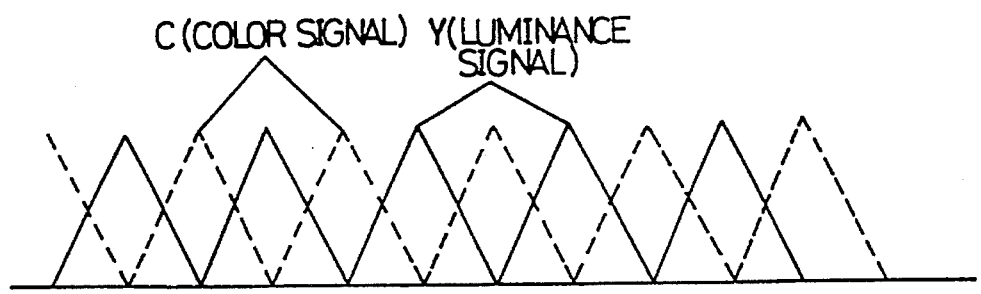
FIG. 2 shows a spectrum of a luminance signal and a color signal near a color subcarrier.
Figure 3:
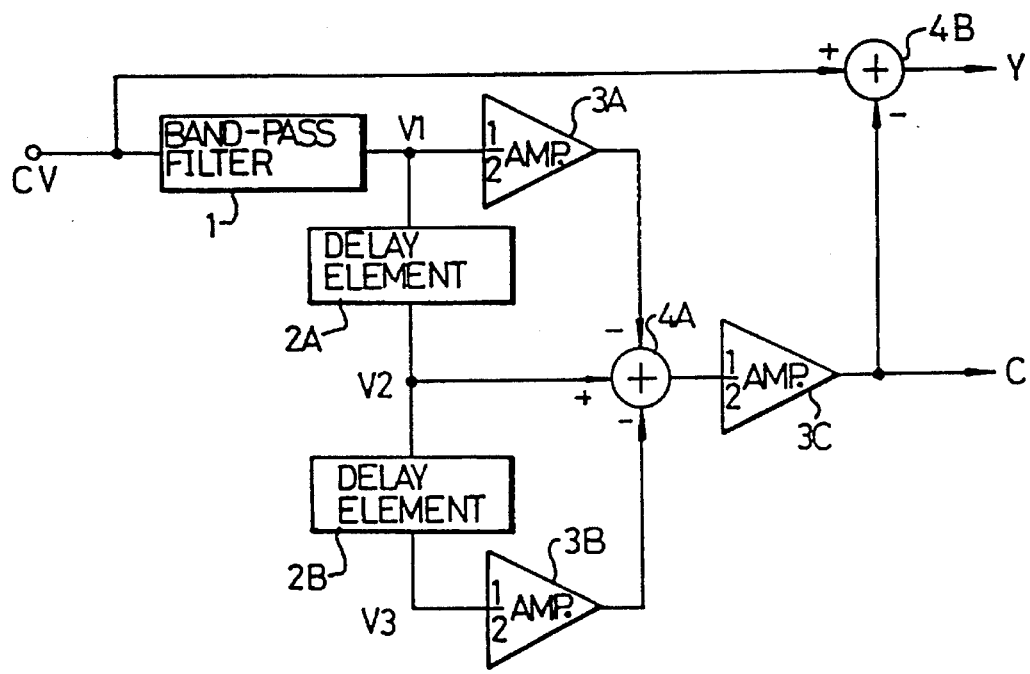
FIG. 3 is a block diagram of general 2-line or 2-frame delay comb filter.
Figure 4:
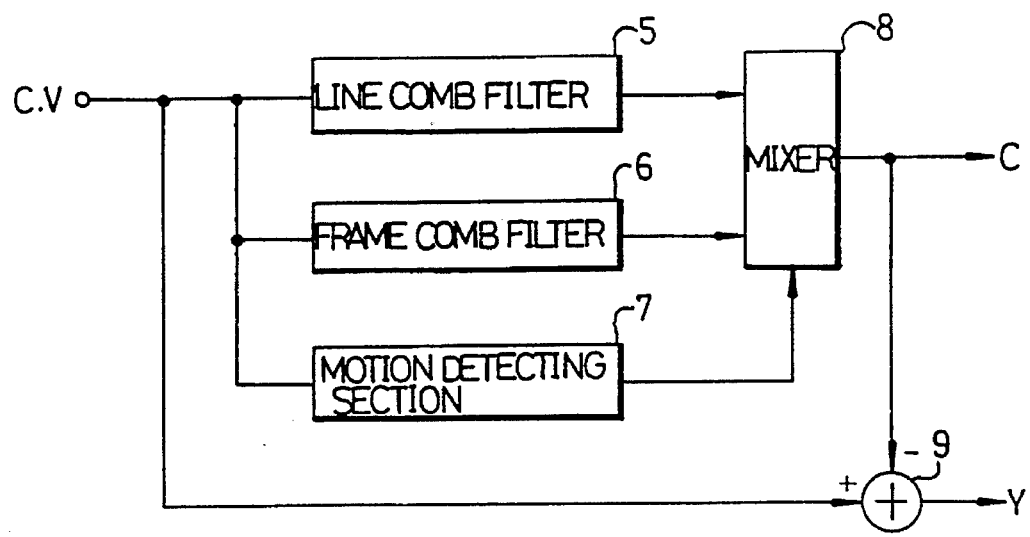
FIG. 4 is a schematic block diagram of a general motion adaptive luminance/color signal separating device.
Figure 8A:
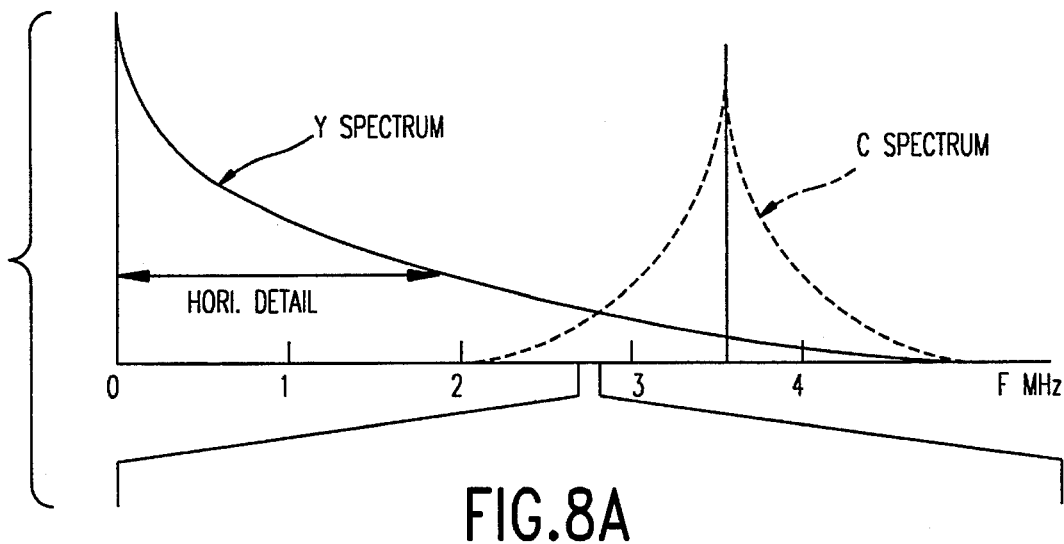
FIGS. 8A to 8C show spectrum views of NTSC color television signal.
Figure 8B:
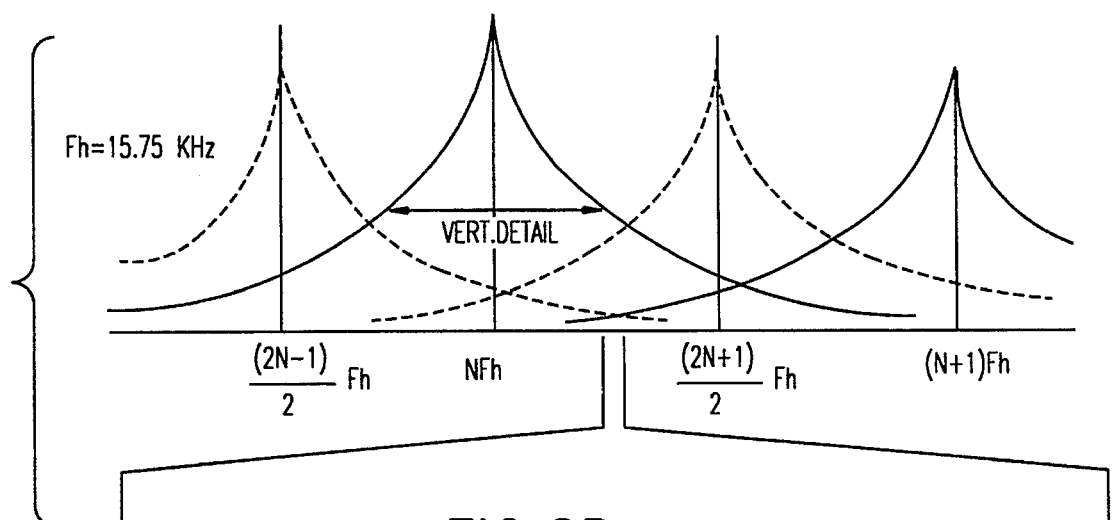
Figure 8C:
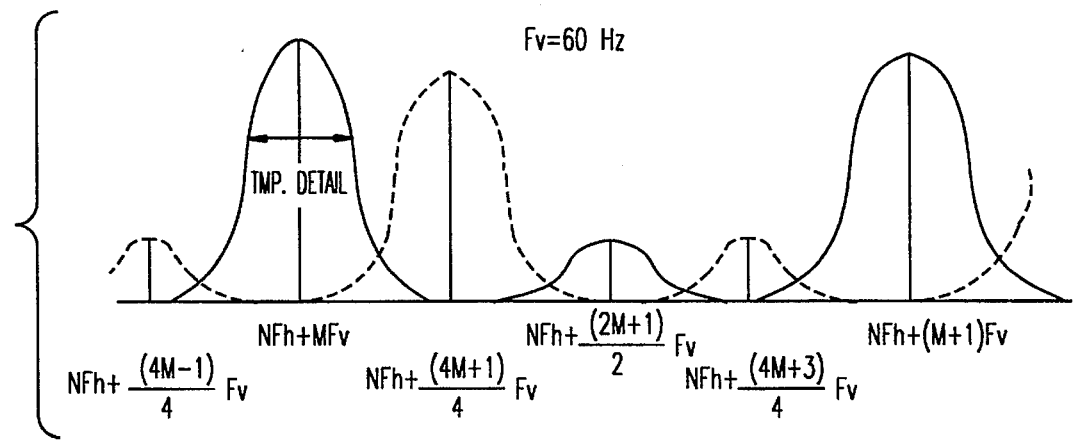

First of all, FIGS. 8A to 8C show the spectrum structure of the NTSC color television signal. When an image largely varies in a horizontal direction (i.e. horizontal detail components increase), spectrum blurring of luminance and color signals increases in a gross structure as shown in FIG. 3A (i.e., high frequency components of luminance and color signals become large), thereby increasing the overlapped components of luminance and color signals. Also, when an image largely varies in a vertical direction (i.e., vertical detail components increase), spectrum blurring of luminance and color signals increases in a fine structure as shown in FIG. 8B, thereby increasing the overlapped components of luminance and color signals. Meanwhile, when an image greatly varies in a temporal direction (i.e., temporal detail components increase), the spectrum blurring of luminance and color signals increases in the spectrum structure as shown in FIG. 8C, thereby increasing the overlapped components between luminance and color signals. From these facts, it can be known that it is preferable for the luminance/color signal separation to be performed in a structure having the smallest overlap.

Referring to FIG. 5, an inputted analog composite video signal CV is sampled with a sampling frequency of 4 fsc by A/D converter 10, and is band-pass filtered with respect to a color subcarrier by band-pass filter 20. The band-pass filtered signal is separated by 2S C-comb filter 30, 2H C-comb filter 40, and 2F C-comb filter 50, respectively, and then is supplied to mixer 70. At this time, controller 60 determines how much the spectrum of luminance and color signals are overlapped, and generates a control signal for mixer 70 to output as a final color signal C the color signal separated from the luminance signal in a state having the fewest overlapping components between the luminance and color signals. And, adder 80 detects and outputs a luminance signal Y by subtracting the separated color signal C outputted from mixer 70 from the composite video signal outputted from A/D converter 10.

Figure 6:
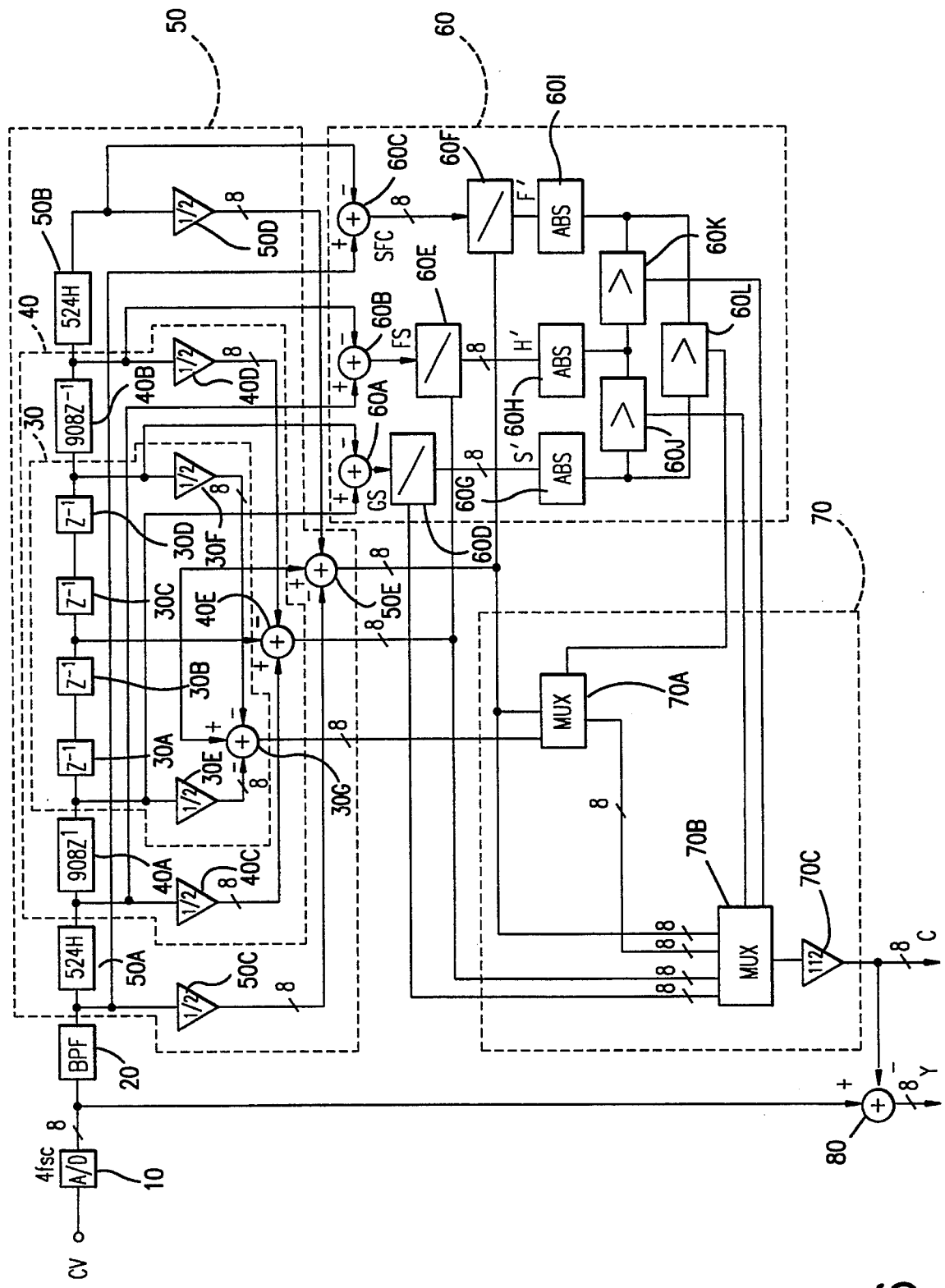
FIG. 6 is a circuit diagram showing an embodiment of the present device shown in FIG. 5.

Referring to FIG. 6, the composite video signal CV is sampled with 4 fsc by A/D converter (AD) 10 and is then band-pass filtered with respect to the color subcarrier by band-pass filter (BPF) 20. The bandpass filtered signal is 2S C-comb filtered by 2S C-comb filter 30 which is composed of sample delays 30A to 30D, ½ amplifiers 30E and 30F and adder 30G, 2H C-comb filtered by 2H C-comb filter 40, and 2F C-comb filtered by 2F C-comb filter 50, respectively. Respective adders 60A, 60B and 60C output signals GS, FS, and SFS, whose interference components in the gross, fine, and superfine structures are detected and filtered.

And, divider 60D divides the signal GS whose interference components in the gross structure are detected and filtered, inputted from adder 60A by 2S C-comb filtered signal S inputted from adder 30G, thereby outputting its result value S'(=Gs/S). Divider 60E divides the signal FS whose interference components in the fine structure are detected and filtered, inputted from adder 60B by the 2H C-comb filtered signal H, thereby outputting its result value H'(=Fs/H). Divider 60F divides the signal SFS whose interference components in the superfine structure are detected and filtered, inputted from adder 60C by the 2F C-comb filtered signal F inputted from adder 50E, thereby outputting its result value F'(=SFS/F).

The respective division-processed signals S', H' and F' are supplied to absolute value generators (ABS) 60G, 60H and 60I, respectively, and their corresponding absolute values are calculated. The outputs of multiplexers (MUX) 70A and 70B are controlled according to the result of comparison of the output values by absolute value generators 60G, 60H, and 60I. Multiplexer (MUX) 70B outputs color signal separated from luminance signal in a structure having the smallest ratio, and the outputted signal is ½-amplified by ½ amplifier 70C to be outputted as a final color signal C. And, adder 80 detects and outputs a luminance signal Y by subtracting the color signal C supplied from ½ amplifier 70C from the A/D converted composite video signal CV.

Figure 7:
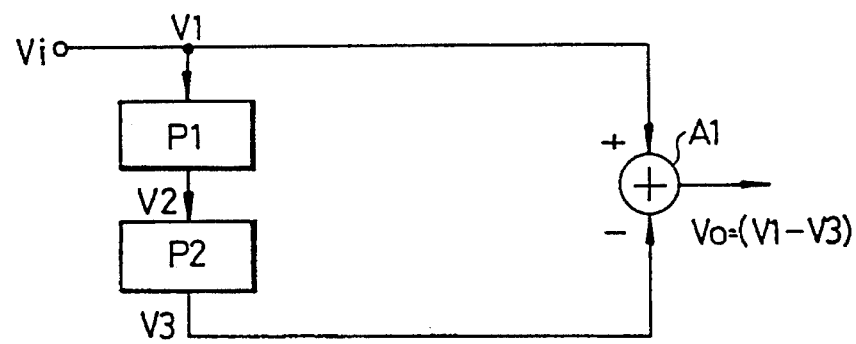
FIG. 7 is a block diagram of an interference component detecting filter applied in the present invention.

FIG. 7 shows an interference component detecting filter applied in the present invention. The input video signal V1 is outputted as a 2-period delayed signal V3 by sequentially passing through delay elements P1 and P2. Adder A1 outputs a linearly combined output signal V0=V1-V3 by subtracting the 2-period delayed signal V3 from the input video signal V1.

Figure 9:
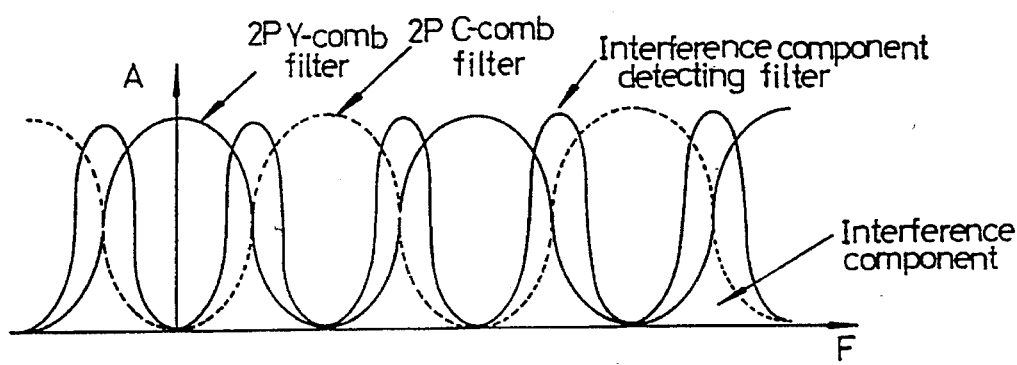
FIG. 9 is a waveform diagram explaining the characteristic of frequency amplitude of a luminance/color signal overlapped component detecting filter.

FIG. 9 shows a frequency amplitude characteristic of the interference component detecting filter shown in FIG. 7. Referring to FIG. 9, the frequency amplitude characteristic of the interference component detecting filter shows that the Y(luminance)-comb filter and the C-comb filter use the overlapping portion as a pass band. Accordingly, if the interference component detected-and-filtered signal divided by the C-comb filtered signal is large, the interference component is large and if it is small, it means that the interference component is small.

By doing this, the spectrum distribution adaptive luminance/color signal separation in gross, fine and superfine structures is implemented.

Referring to FIG. 10 showing the construction of spectrum distribution adaptive 3-dimensional luminance/color signal separating device having a correction function according to the present invention, the composite video signal CV is sampled with a frequency of 4 fsc by A/D converter 110 and is band-pass filtered with respect to the color subcarrier by band-pass filter 120. The band-pass filtered signal is supplied to comb-filters 130 to 150 and correctors 130' to 150', thereby being 2S C-comb filtered, 2H C-comb filtered, and 2F C-comb filtered, respectively, and at the same time, being 2S corrected, 2H corrected, and 2F corrected. Accordingly, the extra interference components remaining in the separated luminance and color signals in gross, fine and superfine structures are removed.

At this time, first controller 160 outputs a weighting factor K1 having consistency with respect to horizontal and vertical regions. First mixer 170 multiplies an output of adder 141 by a weighting factor K1, and also multiplies an output of adder 131 by a weighting factor 1-K1, and outputs a signal obtained by adding the two values. This signal represents luminance and color signals separated in a 2-dimensional region.

Meanwhile, second controller 160' outputs a weighting factor K2 having consistency with respect to a temporal region. Second mixer 170' multiplies an output signal of 2F C-comb filter, whose interference components are removed, outputted from adder 151, by the weighting factor K2, and multiplies the output signal of first mixer 170 luminance/ color signal-separated in the 2-dimensional region by the weighting factor 1-K2, and outputs a signal obtained by adding the two values. This value is a final color signal C. Adder 180 outputs a final luminance signal Y by subtracting the final color signal C from the composite video signal CV outputted from A/D converter 110.

Figure 12:
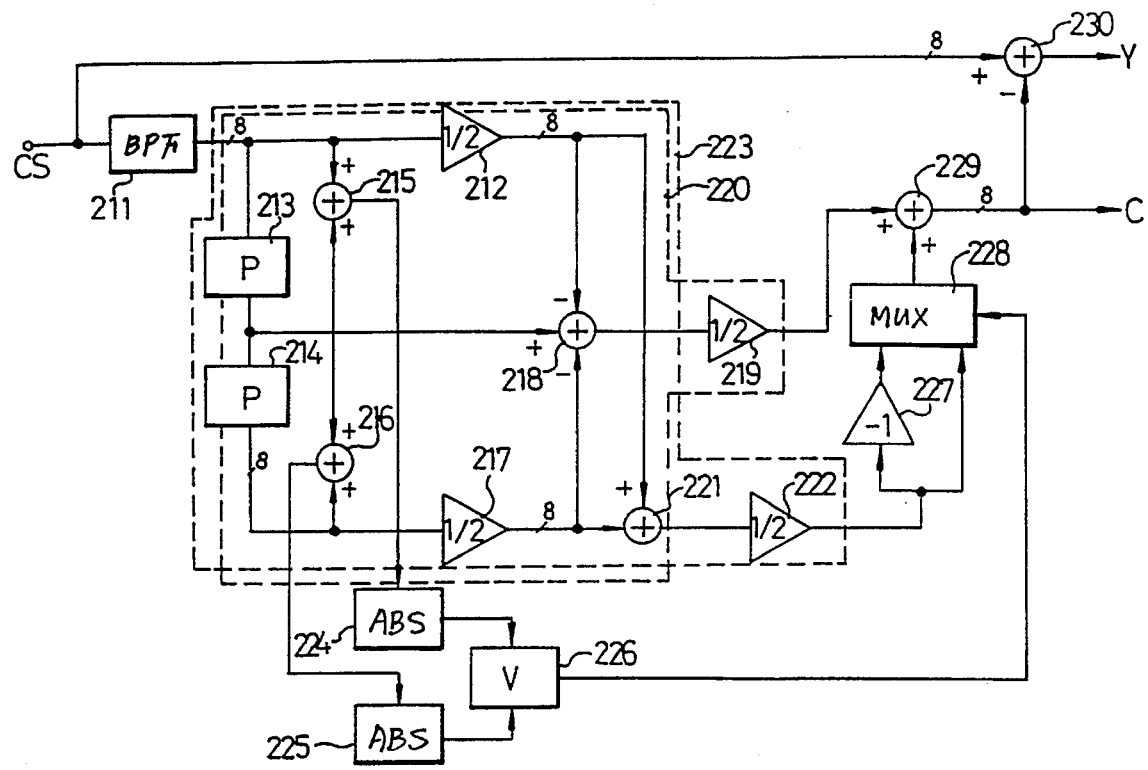
FIG. 12 is a block diagram of 2P comb filter having an interference eliminating function.

FIG. 12 shows the embodied construction of a constant delay period (for example, 2 period (p)) color-comb filter having an interference eliminating function, so as to implement the result described in FIG. 10. With reference to FIG. 12, the interference components of the composite video signal band-pass filtered through the band-pass filter 211 are detected and filtered through 2P C-comb filter 220. The interference components can be eliminated by comparing the absolute values of the outputs of adders 215 and 216 and adding the interference component detected-and-filtered signal to the 2P C-comb filtered signal if the absolute value of adder 215 is larger, and adding the inverted phase value of the interference component detected-and-filtered signal the output signal of 2P C-comb filter 220 if the absolute value of adder 216 is larger. Adder 230 outputs the final luminance signal Y by subtracting a color signal C outputted from adder 220 from the input composite video signal CV.

Figure 13:
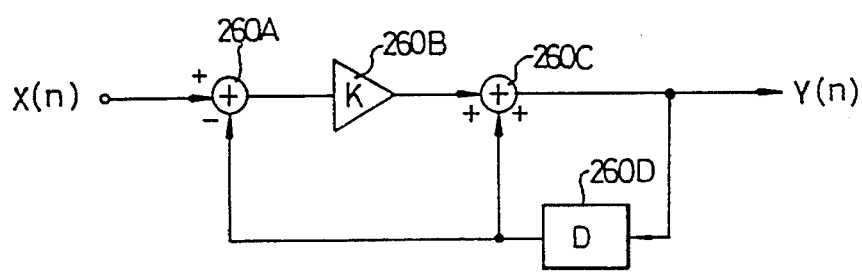
FIG. 13 is a block diagram of IIR filter applied in the control signal.
Figure 15:
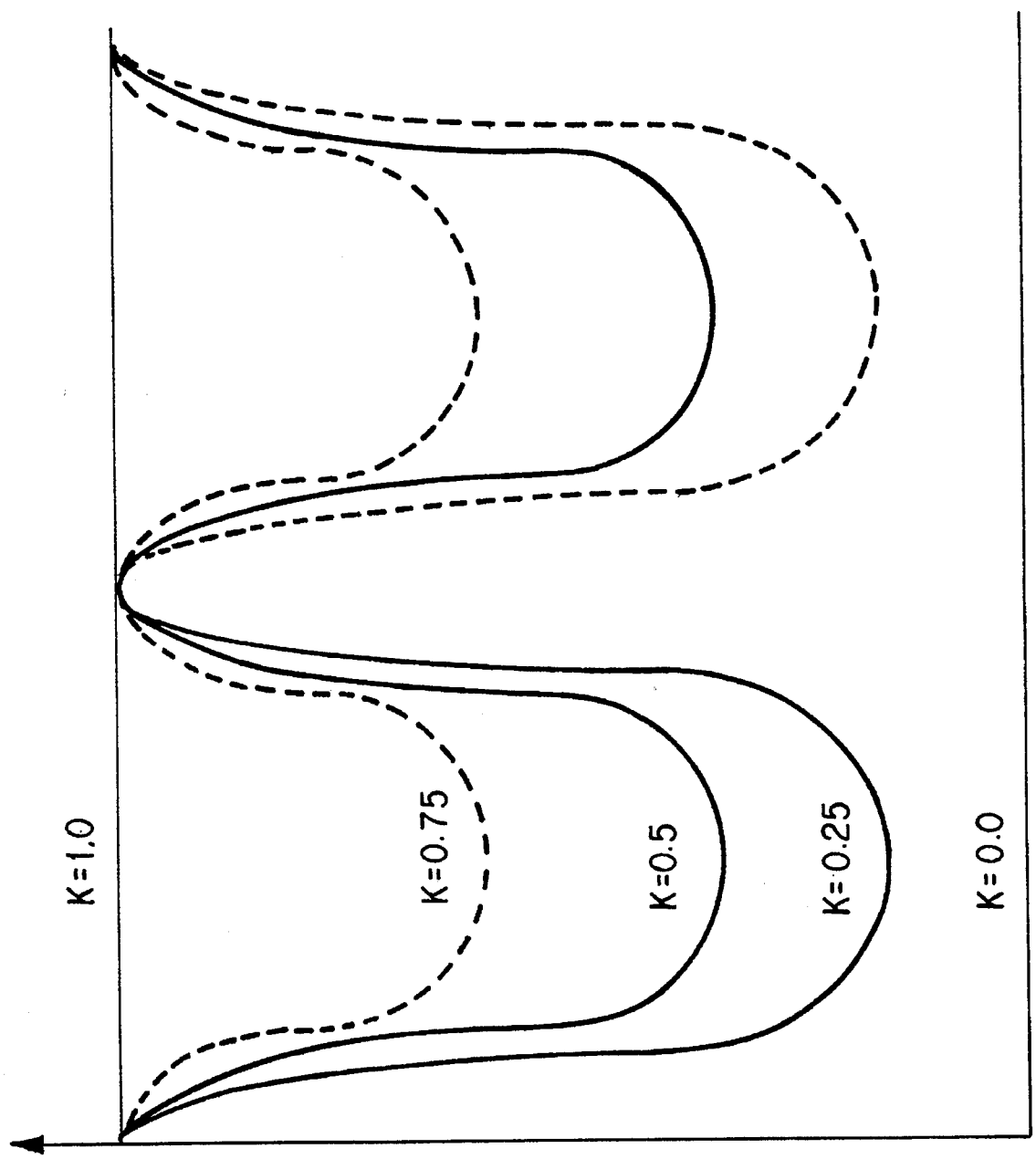
FIG. 15 is a view explaining the frequency response characteristic of IIR filter applied in the present invention.

FIG. 13 shows the constitution of the IIR filter applied in the present invention to keep consistency of control signal. If an input control signal is X(n), the output becomes $Y(n)=K \cdot X(n)+(1-K)Y(n-1)$, and the frequency response of this filter becomes $H(e^{jw})= K/1-(1-K)(e^{jw})$. As shown in FIG. 15, the response according to the value K is sensitive to the input control signal if the value K is large, thereby having difficulty in keeping consistency. If the value K is too small, the sensitivity of the input control signal overly decreases. Experimentally, the proper value K is in 0.5 to 0.9, and the selection of 0.75 is most preferred in consideration of hardware.

FIG. 14 shows the input/output relation of 2P C-comb filter. Here, the input video signal is V1, the 1-period delayed signal is V2, and the 2-period delayed signal is V3. If the luminance/color-separated signal is equal to the 1-period delayed signal V2, it can be thought that the accurate luminance/color signal separation is performed. However, if the 2P C-comb filter is applied in the video signal having a change, the output such as FIG. 14D having a difference from the 1-period delayed signal V2 is obtained. This difference causes the picture quality deterioration phenomenon such as cross-color or cross-luminance. If the signal such as FIG. 14E is added into the 2P C-comb filtered signal, the signal such as FIG. 14B is obtained. It can be known that the signal such as FIG. 14E has the same amplitude as the interference component detected-and-filtered signal described in FIG. 7 and only its phase is inverted according to the signal characteristic.

Figure 11A:
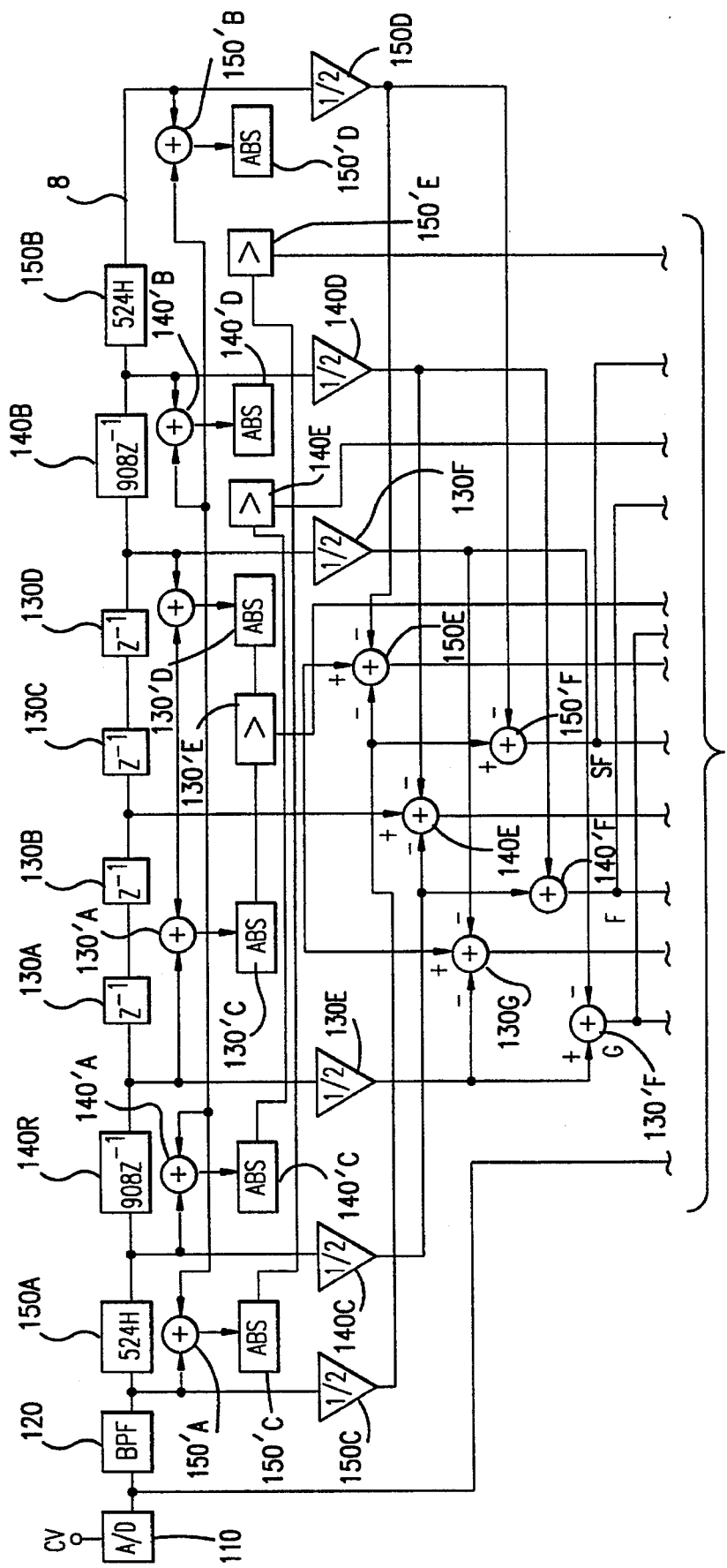
FIG. 11A and 11B are a circuit diagram showing an embodiment of the present invention shown in FIG. 10.
Figure 11B:
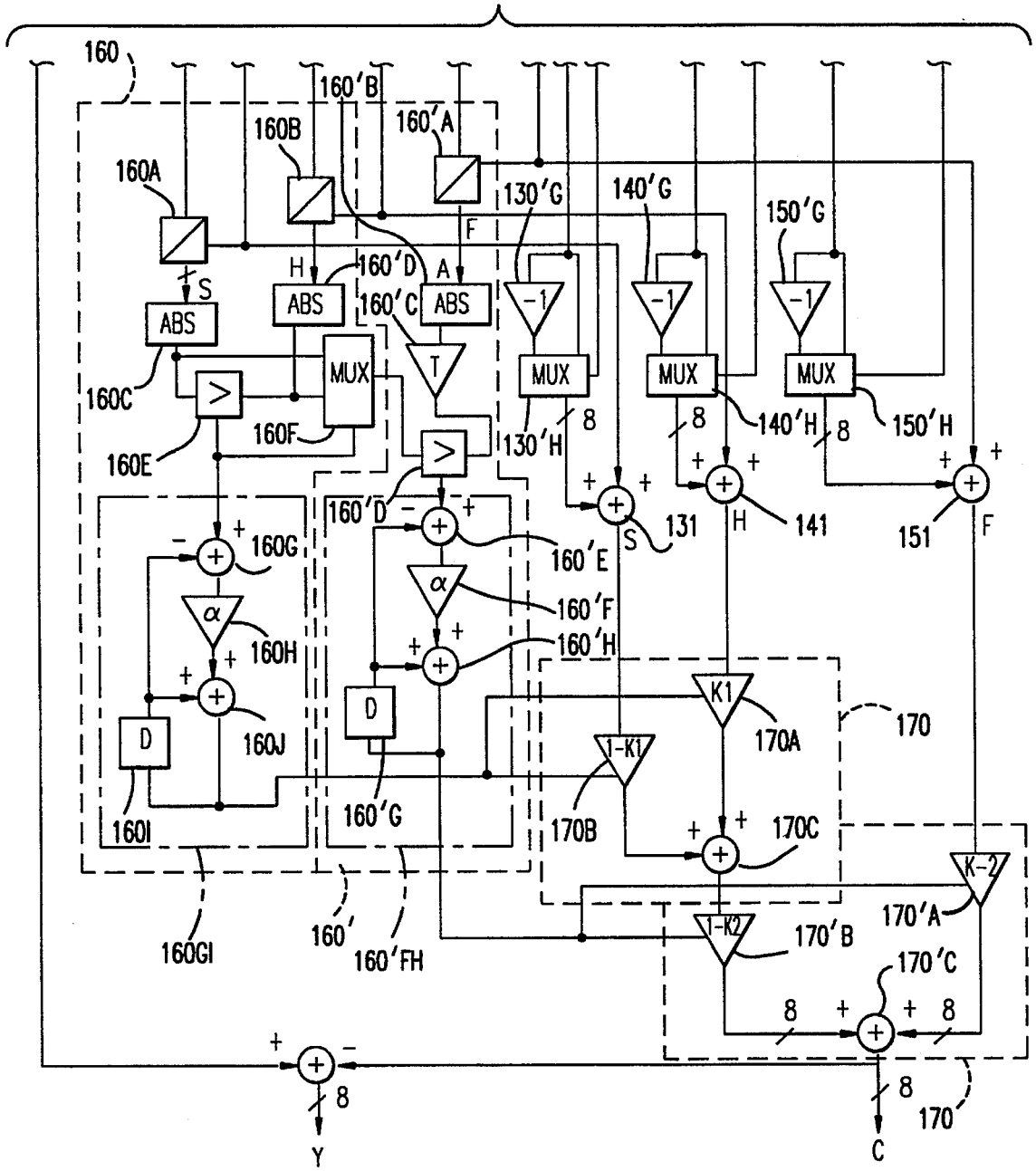

Also, FIGS. 11A and 11B show the embodied circuit diagram of the spectrum distribution adaptive 3-dimensional luminance/color signal separating device having the correction function according to the present invention. The analog composite video signal CV is converted into a digital signal sampled with a frequency of 4 fsc by A/D converter 110, and is band-pass filtered with respect to the color subcarrier fsc through band-pass filter 120. The band-pass filtered output signal sequentially passes a 524-line memory 150A, a 908-sample memory 140A, 1-sample memories 130A, 130B, 130C, and 130D, a 908-sample memory 140B, and a 524-line memory 150B, thereby being outputted as a signal delayed by the respective corresponding times.

Respective adders 130G, 140E, and 150E are supplied with the delayed signal, and respectively output a 2S C-comb filtered signal 2S, a 2H C-comb filtered signal 2H, and a 2F C-comb filtered signal 2F. At the same time, interference components in gross, fine and superfine structures are detected and filtered. Adder 130' F. outputs a signal G whose interference components in the gross structure are detected and filtered, adder 140'F outputs a signal F whose interference components in the fine structure are detected and filtered, and adder 150'F outputs a signal SF whose interference components in the superfine structure are detected and filtered.

As described in FIG. 12, respective adders 131, 141 and 151 add the output of the detecting filter having a changed phase to the outputs of respective C-comb filters 130G, 140E, and 150E, according to the characteristic of image. Accordingly, the interference luminance components included in the C-comb filtered signal are eliminated. Adder 131 outputs the 2S C-filtered signal S, adder 151 outputs the 2H C-filtered signal H, and adder 151 outputs the 2F C-filtered signal F.

First controller 160 outputs the weighting factor (K1: 0.0~1.0) keeping consistency in horizontal and vertical regions. First mixer 170 multiplies the 2H C-comb filtered signal H whose interference components are eliminated, by the weighting factor K1, and also multiplies the 2S C-comb filtered signal S whose interference components are eliminated, by the weighting factor 1-K1.

Second controller 160' outputs the weighting factor (K2: 0.0~1.0) keeping consistency with respect to a temporal region. Second mixer 170' multiplies the 2F C-comb filtered signal F whose interference components are eliminated, by the weighting factor K2. Through the above process, the separated color signal is multiplied by the weighting factor 1-K2. Through the above process, the final separated luminance signal Y is outputted from adder 180.

As described above in detail, the present invention uses the control signal according to the spectrum distribution adaptive system, thereby solving the problem generated in motion adaptive system. Also, the present invention uses the value where luminance/color signal separation is performed in the region having the smallest interference component by determining the level of the interference component in the gross, fine, and superfine structures, thereby solving the problem generated in the fixed luminance/color signal separation. Also, good efficiency can be obtained by only the luminance/color signal separation process in two dimensional (horizontal and vertical) regions using the interference component eliminating function. The consistency of control signal is kept by introducing the concept of IIR filter in the control signal, so that the luminance/color signal separation suitable for human visual characteristic can be done. The control signal obtained in the suggested spectrum distribution adaptive system is applicable in other image processing.

While the present invention has been described and illustrated herein with reference to the preferred embodiments thereof, it will be understood by those skilled in the art that various changes in form and details may be made therein without departing from the spirit and scope of the invention.

What is claimed is:

1. A spectrum distribution adaptive luminance/color signal separating device comprising:

an analog/digital converter for digital-converting an analog composite video signal;

a band-pass filter for band-pass filtering an output signal of said analog/digital converter with respect to a color subcarrier frequency band;

a 2-sample color-comb filter for 2-sample color signal-comb filtering an output signal of said band-pass filter;

a 2-line color-comb filter for 2-line color signal-comb filtering an output signal of said band-pass filter;

a 2-frame color-comb filter for 2-field color signal-comb filtering an output signal of said band-pass filter;

a controller for providing a switching control signal according to interference components in gross, fine and superfine structures, based on an output signal of said 2-frame color-comb filter;

a mixer being supplied with respect to output signals of said 2-sample color-comb filter, said 2-line color-comb filter and said 2-frame color-comb filter according to a switching control signal provided from said controller, and accordingly selecting and providing a separated color signal in a structure having a smallest spectrum overlap between luminance and color signals in said gross, fine and superfine structures; and an adder for providing a luminance signal by subtracting said color signal provided from said mixer from said digital-converted composite video signal.

2. A spectrum distribution adaptive luminance/color signal separating device as claimed in claim 1, wherein said controller comprises:

a first divider for determining a ratio of a signal whose interference components in said gross structure are detected and filtered, to a 2-sample color signal-comb filtered signal;

a second divider for determining a ratio of a signal whose interference components in said fine structure are detected and filtered, to a 2-line color signal-comb filtered signal;

a third divider for determining a ratio of a signal whose interference components in said superfine structure are detected and filtered, to a 2-frame color signal-comb filtered signal;

three absolute value generators for respectively producing absolute values of outputs of said first to third dividers; and three comparators for respectively comparing output values of said respective absolute value generators.

3. A spectrum distribution adaptive luminance/color signal separating device as claimed in claim 1, wherein said mixer comprises:

a first multiplexer for selecting a 2-sample color signal-comb filtered signal or a 2-frame color signal-comb filtered signal under the control of said controller;

a second multiplexer for selecting one among 2-sample, 2-line, and 2-field color signal-comb filtered signals, and an output signal of said first multiplexer under the control of said controller; and a ½ amplifier for ½-amplifying an output signal of said second multiplexer.

4. A spectrum distribution adaptive luminance/color signal separating device comprising:

an analog/digital converter for digital-converting an analog composite video signal;

a band-pass filter for band-pass filtering an output signal of said analog/digital converter with respect to a color subcarrier frequency band;

a 2-sample color-comb filter for 2-sample color signal-comb filtering an output signal of said band-pass filter;

a 2-line color-comb filter for 2-line color signal-comb filtering an output signal of said band-pass filter;

a 2-frame color-comb filter for 2-frame color signal-comb filtering an output signal of said band-pass filter;

2-sample, 2-line, and 2-frame correctors connected respectively to said 2-line color-comb filter, said 2-line color-comb filter and said 2-frame color-comb filter for providing signals which eliminate extra interference components remaining in separated luminance and color signals in gross, fine, and superfine structures;

a first controller for providing a weighting factor K1 keeping consistency with respect to horizontal and vertical regions, based on 2-sample and 2-line color signal-comb filtered signals, and two signals filtered in said gross and fine structures, respectively;

a second controller for providing a weighting factor K2 keeping consistency with respect to a temporal region;

a first adder for adding an output signal of said 2-sample corrector to an output signal of said 2-sample color signal-comb filter;

a second adder for adding an output signal of said 2-line corrector to an output signal of said 2-line color signal-comb filter;

a third adder for adding an output signal of said 2-frame corrector to an output signal of said 2-field color signal-comb filter;

a first mixer for adding an output signal of said 2-line color signal-comb filter multiplied by said weighting factor K1 to an output signal of said 2-sample color signal-comb filter whose interference components are eliminated, multiplied by a weighting factor 1-K1, and providing an added signal;

a second mixer for adding an output of said 2-frame color signal-comb filter whose interference components are eliminated, multiplied by a weighting factor K2, to an output of said first mixer multiplied by a weighting factor 1-K2 in a 2-dimensional region, and providing a final color signal; and an adder for detecting a luminance signal by subtracting an output of said second mixer from an output of said analog/digital converter.

5. A spectrum distribution adaptive luminance/color signal separating device as claimed in claim 4, wherein said 2-sample, 2-line, and 2-frame correctors detect change in prior- and post-signals with respect to middle points of respective corresponding delay periods, and providing respective comb filtered signals in said gross, fine and superfine structures, respectively.

6. A spectrum distribution adaptive luminance/color signal separating device as claimed in claim 4, wherein said first controller comprises:

a first divider for dividing a comb filtered signal in said gross structure by a 2-sample comb filtered signal;

a second divider for dividing a comb filtered signal in said fine structure by a 2-line comb filtered signal;

first and second absolute value generators for providing respective absolute values with respect to output signals of said first and second dividers;

a comparator for comparing outputs of said first and second absolute value producers;

a multiplexer for selecting one between outputs of said first and second absolute value generators according to an output value of said comparator; and a first IIR filter being responsive with $H(e^{j\omega})=K/1-(1-$ $K)(e^{jw})$ to an output of said comparator and providing a corresponding weighting factor.

7. A spectrum distribution adaptive luminance/color signal separating device as claimed in claim 4, wherein said second controller comprises:

a divider for dividing a comb filtered signal in said superfine structure by a 2-frame comb filtered signal;

an absolute value generator for determining an absolute value of an output signal of said divider;

a first amplifier for amplifying an output of said absolute value generator by a predetermined level;

a comparator for comparing respective outputs of said multiplexer and said first amplifier; and a second IIR filter being responsive with $H(e^{jw})=K/1-(1-K)(e^{jw})$ to an output of said comparator and providing a corresponding weighting factor.

8. A spectrum distribution adaptive luminance/color signal separating device as claimed in claim 4, wherein said first mixer comprises:

second and third amplifiers for multiplying 2-sample and 2-line comb filtered signals whose interference components are eliminated, by respective weighting factors; and an adder for adding respective output signals of said second and third amplifiers.

9. A spectrum distribution adaptive luminance/color signal separating device as claimed in claim 4, wherein said second mixer comprises:

fourth and fifth amplifiers for multiplying 2-frame comb filtered signal whose interference components are eliminated, and an output signal of said adder by corresponding weighting factors; and an adder for adding respective outputs of said fourth and fifth amplifiers.

* * * * *